US008110034B2

(12) United States Patent
Saito et al.

(10) Patent No.: US 8,110,034 B2
(45) Date of Patent: Feb. 7, 2012

(54) INK SET, AND INK JET RECORDING METHOD USING THE INK SET

(75) Inventors: Chie Saito, Matsumoto (JP); Miharu Kanaya, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 155 days.

(21) Appl. No.: 12/383,565

(22) Filed: Mar. 25, 2009

(65) Prior Publication Data

US 2009/0258147 A1  Oct. 15, 2009

(30) Foreign Application Priority Data

Mar. 25, 2008 (JP) ................. 2008-078590
Feb. 20, 2009 (JP) ................. 2009-037963

(51) Int. Cl.
*C09D 11/02* (2006.01)
(52) U.S. Cl. .................. 106/31.6; 106/31.86
(58) Field of Classification Search .......... 106/31.6, 106/31.86
See application file for complete search history.

(56) References Cited

U.S. PATENT DOCUMENTS 6,866,707 B2 * 3/2005 Kato ............... 106/31.6

FOREIGN PATENT DOCUMENTS

| JP | 08-003498 | 1/1996 |
|---|---|---|
| JP | 10-095941 | 4/1998 |
| JP | 10-212426 | 8/1998 |
| JP | 10-237349 | 9/1998 |
| JP | 2000-219832 | 8/2000 |
| JP | 2001-081366 | 3/2001 |
| JP | 2001-207089 | 7/2001 |
| JP | 2002-080761 | 3/2002 |
| JP | 2002-121434 | 4/2002 |
| WO | WO-01/94476 A2 | 12/2001 |

* cited by examiner

*Primary Examiner* — Jerry Lorengo
*Assistant Examiner* — Veronica F Faison
(74) *Attorney, Agent, or Firm* — Nutter McClennen & Fish LLP; John J. Penny, Jr.

(57) ABSTRACT

An ink set for ink jet recording that realizes a satisfactory image in addition to high color-developing ability, high ejection stability, and high recover ability from clogging is provided.

An ink set contains two or more ink compositions at least including a black ink composition and a color ink composition. The black ink composition includes a self-dispersing pigment having a hydrophilic group on the surface thereof and the color ink composition includes a self-dispersing pigment having a hydrophilic group on the surface thereof with a phenyl group interposed therebetween. The ink set is used for an ink jet recording method.

9 Claims, No Drawings

INK SET, AND INK JET RECORDING METHOD USING THE INK SET

CROSS-REFERENCES TO RELATED APPLICATIONS

The entire disclosure of Japanese Patent Application No. 2008-78590, filed on Mar. 25, 2008, and No. 2009-037963, filed on Feb. 20, 2009, and are expressly incorporated by reference herein.

FIELD OF THE INVENTION

The present invention relates to an ink set containing two or more different ink compositions that include a black ink composition and a color ink composition, or an ink jet recording method where printing is carried out by attaching an ink composition to a recording medium.

BACKGROUND OF THE INVENTION

An ink jet recording method is a printing method where printing is performed by causing small droplets of ink to fly out and adhere to a recording medium such as paper. Generally, any of various aqueous dyes dissolved in water, or in water and a water-soluble organic solvent may be used as an ink. It has generally been pointed out that an image formed by ink containing such a water-soluble dye is poor in waterfastness and lightfastness.

On the other hand, ink obtained by dispersing a pigment in an aqueous medium is excellent in waterfastness and lightfastness. For example, an aqueous pigment ink in which a pigment is dispersed in a surfactant or a polymer dispersant has been proposed. In these inks, however, there has been a case of an exponential increase in ink viscosity occurring when increasing the content of a colorant in the ink to raise the printing density of a recorded material. In addition, there has been a case that the need for an excessive amount of a surfactant or a polymer dispersant to stably disperse a pigment in ink led to a decrease in printing stability due to bubble generation and decreased defoaming property.

To solve these problems, a dispersion liquid for a self-dispersing pigment has been disclosed. It is prepared by introducing a predetermined amount or more of surface-active hydrogen or a salt thereof to the surface of the pigment so that it can disperse alone in a water-based solvent even without the presence of a surfactant or a dispersant such as a polymer dispersant.

In JP-A-10-237349 (Patent Document 1), JP-A-8-3498 (Patent Document 2), and International Publication No. 01/94476 pamphlet (Patent Document 3), so-called self-dispersing pigments that do not require any dispersant as described above are reported to achieve the following, when used as colorants in ink: an increase in OD value (optical density) of an image; ease of use because of facilitating the adjustment of viscosity in ink to within a proper range; consideration of the compatibility of the dispersant with various kinds of solvents to be added is not needed; and so on. A hydrophilic functional group, such as a carbonyl group, a carboxyl group, a hydroxyl group, a sulfone group, or an ammonium group, is bonded to the pigment surface directly or indirectly through an alkyl group, an aryl group, or the like.

Furthermore, JP-A-10-95941 (Patent Document 4), JP-A-2001-207089 (Patent Document 5), and JP-A-2000-219832 (Patent Document 6) propose ink jet inks that contain the above self-dispersing carbon black, glycol ethers, and so on.

On the other hand, there is a problem in that an image formed with an ink using such a self-dispersing pigment as a colorant is generally poor in fixability. A recorded material with a sufficient rubfastness may not be obtained because of smudging the image when the image is scrapped by a finger, a line marking pen, paper, or the like. Therefore, to improve the fixability of the self-dispersing pigment to a recording medium, a proposal has been made to add a resin having binding efficacy to a recording medium.

JP-A-2001-81366 (Patent Document 7) and JP-A-2002-80761 (Patent Document 8) propose, as an ink composition containing resin particles, a recording liquid consisting of a colorant, resin fine particles, and water; a recording liquid for an ink printer consisting of a pigment dispersed in water and resin fine particles; and so on.

On the other hand, JP-A-2002-121434 (Patent Document 9) discloses an aqueous color ink set for ink jet recording that contains a black ink and also contains at least a cyan ink, a magenta ink, and a yellow ink as color inks, where the black ink and the respective color inks contain pigments which are self-dispersible in water. In addition, it is also disclosed that a self-dispersing pigment can be prepared by treating, for example, a cyan pigment with sulfanilic acid and sodium sulfite.

Furthermore, JP-A-10-212426 discloses an oxidation-treated carbon black obtained by oxidation treatment of carbon black with an oxidizing agent and a method for manufacturing a carbon black dispersion liquid therefrom (see Patent Document 10). However, there is no disclosure about the surface treatment of pigments for color ink compositions.

RELATED ART

[Patent Document 1] JP-A-10-237349
[Patent Document 2] JP-A-8-3498
[Patent Document 3] International Publication No. 01/94476 pamphlet
[Patent Document 4] JP-A-10-95941
[Patent Document 5] JP-A-2001-207089
[Patent Document 6] JP-A-2000-219832
[Patent Document 7] JP-A-2001-81366
[Patent Document 8] JP-A-2002-80761
[Patent Document 9] JP-A-2002-121434
[Patent Document 10] JP-A-10-212426

SUMMARY OF THE INVENTION

The present inventors have found that an ink set comprising at least two or more ink compositions that include at least a black ink composition and a color ink composition, where the black ink composition includes a self-dispersing pigment having a hydrophilic group on the surface thereof and the color ink composition includes a self-dispersing pigment having a hydrophilic group thereon with a phenyl group interposed therebetween, realizes a satisfactory image in addition to realizing high color-developing ability, high ejection stability, and high recover ability from clogging. The present invention is based on these findings.

Therefore, it is an object of the present invention to provide an ink set for ink jet recording that realizes a satisfactory image in addition to high color-developing ability, high ejection stability, and high recover ability from clogging.

In addition, the ink set of the present invention is an ink set comprising at least two or more ink compositions that include at least a black ink composition and a color ink composition, where the black ink composition includes a self-dispersing pigment having a hydrophilic group on the surface thereof and the color ink composition includes a self-dispersing pigment having a hydrophilic group on the surface thereof with a phenyl group interposed therebetween.

Furthermore, an ink jet recording method according to the present invention is an ink jet recording method comprising ejecting liquid droplets of an ink composition and allowing the ink droplets to adhere to a recording medium to perform printing, where the method uses the above ink set.

According to the present invention, there can be provided an ink set for ink jet recording that realizes a satisfactory image in addition to high color-developing ability, high ejection stability, and high recover ability from clogging.

DETAILED DESCRIPTION OF THE PRESENT INVENTION

The ink set according to the present invention is an ink set comprising at least two or more ink compositions that include at least a black ink composition and a color ink composition, characterized in that the black ink composition includes a self-dispersing pigment having a hydrophilic group on the surface thereof and the color ink composition includes a self-dispersing pigment having a hydrophilic group on the surface thereof with a phenyl group interposed therebetween. Hereinafter, the black ink composition and the color ink compositions that constitute the ink set of the present invention will be described.

Black Ink Composition

A pigment of the black ink composition, which can be used in the present invention, is a self-dispersing pigment.

The term "self-dispersing pigment" means a pigment that can be dispersed and/or dissolved in an aqueous medium without a dispersant. Here, the expression "dispersed and/or dissolved in an aqueous medium without a dispersant" refers to the state of a pigment that stably exists in water due to the hydrophilic group on the surface thereof without the aid of any dispersant for dispersing the pigment.

There is no need for the ink containing the self-dispersing pigment as a colorant to contain a dispersant such as one described above used to disperse a usual pigment. Therefore, little foaming, ordinarily due to a result of a decrease in defoaming caused by a dispersant, occurs, facilitating the preparation of an ink with excellent ejection stability. In addition, it can be easily handled because a significant increase in viscosity caused by a dispersant is suppressed. For example, the pigment can be included in a larger concentration than before and printing density can be thus increased sufficiently.

The black ink composition of the present invention is a self-dispersing pigment having a hydrophilic group on the pigment surface thereof. The hydrophilic group is preferably one or more hydrophilic groups selected from the group consisting of: —OM, —COOM, —CO—, —$SO_3M$, —$SO_2M$, —$SO_2NH_2$, and —$RSO_2M$, —$PO_3HM$, —$PO_3M_2$, —$SO_2NHCOR$, —$NH_3$, and —$NR_3$ (wherein M represents a hydrogen atom, an alkali metal, ammonium, or organic ammonium and R represents an alkyl group having 1 to 12 carbon atoms or a naphthyl group having a substituent).

In addition, pigments which can be used as materials for the above self-dispersing pigment of the black ink composition include carbon blacks manufactured by known methods such as a contact method, a Furness method, and a thermal method. Specific examples of the carbon blacks preferable for use in the present invention include: No. 2300, 900, MCF88, No. 20B, No. 33, No. 40, No. 45, No. 52, MA7, MA8, MA100, and No 2200B (all manufactured by Mitsubishi Chemical Corporation); Color Black FW1, FW2, FW2V, FW18, FW200, S150, S160, and S170, Pretex 35, U, V, and 140U, Special Black 6, 5, 4A, 4, and 250 (all manufactured by Degussa AG make), Conductex S.C., Raven 1255, 5750, 5250, 5000, 3500, 1255, and 700 (all manufactured by Columbia Carbon Inc.); Regal 400R, 330R, and 660R, Mogul L, Monarche 700, 800, 880, 900, 1000, 1100, 1300, and 1400, and Elftex 12 (manufactured by Cabot Corporation); and so on. These carbon blacks may be used singly or as a mixture of two or more kinds.

The self-dispersing pigment of the black ink composition can be manufactured by bonding (grafting) the hydrophilic group on to the surface of the pigment by subjecting the pigment to a physical treatment or a chemical treatment. The physical treatment may be, for example, a vacuum plasma treatment or the like. Also, the chemical treatment may be, for example, a wet oxidation method where an oxidizing agent is used for oxidation in water.

In the present invention, a black self-dispersing pigment subjected to a surface treatment performed by an oxidation treatment with hypohalous acid and/or hypohalate, an oxidation treatment with ozone, or an oxidation treatment with persulfuric acid and/or persulfate, is preferable in terms of high color development. In addition, a commercially-available product may be used as the self-dispersing pigment of the black ink composition, and preferable examples thereof include Micro Jet CW1 (manufactured by Orient Chemical Industries, Ltd.) and so on.

The content of the self-dispersing pigment in the black ink composition is preferably 6 wt % or more. If the concentration of the pigment in the black ink composition is 6 wt % or more, a recorded material made therefrom shows high color development.

In addition, the self-dispersing pigment has an average particle size preferably ranging from 50 to 250 nm from the view point of the storage stability of ink, prevention of nozzle clogging, and so on.

Preferably, all the black ink compositions according to the present invention contain at least 60 to 10 wt % of water, and an aqueous organic solvent and a surfactant.

The content of water in the ink composition is defined within the above range. Thus, the amount of water absorbed by cellulose in coated paper becomes less than that of a conventional ink composition. Therefore, swelling of cellulose, which have been considered to be a cause of cockling and curling, can be controlled. Therefore, the ink composition of the present embodiment is also useful for a recording medium having an absorption layer of a paper-base material with poor ink absorbency, such as plain paper or coated paper for printing (printing stock).

Water contained in the black ink composition of the present invention is a main solvent, and it is preferable to use pure water or ultrapure water, such as ion-exchanged water, ultrafiltration water, reverse osmosis water, or distilled water. In particular, it is preferable to use water sterilized by UV irradiation, addition of hydrogen peroxide, or the like from the viewpoint of preventing the generation of molds and bacteria to allow the ink composition to be stored for a long period of time.

In the present invention, the above aqueous organic compounds include, for example, polyhydric alcohols, such as glycerin, 1,2,6-hexanetriol, trimethylolpropane, ethylene glycol, propylene glycol, diethylene glycol, triethylene glycol, tetraethylene glycol, pentaethylene flycol, dipropylene glycol, 2-butene 1,4-diol, 2-ethyl-1,3-hexandiol, 2-methyl-2, 4-pentanediol, 1,2-octanediol, 1,2-hexandiol, 1,2-pentanediol, 4-methyl-1, and 2-pentanediol; saccharides, such as glucose, mannose, fructose, ribose, xylose, arabinose, galactose, aldonic acid, glucitol, (sorbitol), maltose, cellobiose, lactose, sucrose, trehalose, and malto triose; so-called solid wetting agents, such as sugar alcohols, hyaluronic acids, and ureas; alkyl alcohols with 1 to 4 carbon atoms, such as ethanol, methanol, butanol, propanol, and isopropanol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether; and 2-pyrrolidone, N-methyl-2-pyrrolidone, 1,3-dimethyl-2-imidazolidinone, formamide, acetamide, dimethyl sulfoxide, sorbitol, sorbitan, acetin, diacetin, triacetin, sulfolane, and so on. One or two or more of them can be used. The content of any of these water-soluble organic solvents in the black ink composition is preferably 10 to 90 wt % in terms of ensuring proper physical properties (such as viscosity) of the black ink composition and ensuring printing quality and reliability. Since the black ink composition of the present invention includes any of these aqueous organic solvents, satisfactory storage stability and satisfactory ejection stability are obtained even if it has a high solid content.

Furthermore, the present invention can provide a black ink composition with excellent reliability in terms of printing quality, ejection stability, recover ability from clogging, and so on by a combined use of at least polyvalent alcohols, butyl ethers of glycol, and pyrrolidones. This reveals that polyvalent alcohols are suitable for the control of water retention (moistness) and the permeability of a black ink composition to a recording medium, such as plain paper; butyl ethers of glycol are suitable for the control of ejection stability and the permeability of an ink composition to a recording medium; and pyrrolidones largely contribute to the storage stability and color development of an ink composition. Therefore, a black ink composition with high reliability with respect to printing quality, ejection stability, recover ability from clogging, and so on can be provided by the use of polyvalent alcohols in combination with the butyl ethers of glycol and pyrrolidones.

In this embodiment, furthermore, it is preferred that the black ink composition includes, as a water-soluble organic solvent, polyvalent alcohols in addition to 5 wt % or more of polyvalent alcohol monoalkyl ether and/or a nitrogen-containing cyclic compound. The use of such a water-soluble organic solvent can suppress cockling and curling while securing printing quality in terms of bleeding, unevenness, and the like.

Here, polyvalent alcohol monoalkyl ethers include, among the above glycol ethers, for example, diethylene glycol monoethyl ether, diethylene glycol monobutyl ether, diethylene glycol monoisobutyl ether, dipropylene glycol monomethyl ether, dipropylene glycol monoisopropyl ether, dipropylene glycol monoisopropyl ether, dipropylene glycol monobutyl ether, triethylene glycol monomethyl ether, triethylene glycol monobutyl ether, tripropylene glycol monomethyl ether, and tripropylene plycol monobutyl ether, and so on. Nitrogen-containing cyclic compounds include, for example, 1,3-dimethyl-2-imidazolidinone, 2-pyrrolidone, N-methyl-2-pyrrolidone, and epsilon caprolactam.

Here, furthermore, the polyvalent alcohols may be any of the above polyvalent alcohols, but specifically it is preferable to include 1,2-alkanediol, such as 1,2-pentanediol, 1,2-hexandiol, and 1,2-octanediol.

Surfactants, which can be contained in the black ink composition of the present invention, include anionic surfactants, cationic surfactants, amphoteric surfactants, and nonionic surfactants. Among them, the nonionic surfactants are particularly preferable from the viewpoint of obtaining an ink composition with little bubbling/foaming.

Further specific examples of the nonionic surfactants include acetylene glycol-based surfactants; acetylene alcohol-based surfactants; ester-based surfactants, such as those of polyoxyethylene nonylphenyl ether, polyoxyethylene octylphenyl ether, polyoxyethylene dodecylphenyl ether, polyoxyethylene alkyl aryl ether, polyoxyethylene oleylether, polyoxyethylene lauryl ether, polyoxyethylene alkyl ether, and polyoxyalkylene alkyl ether; ester-based surfactants, such as those of polyoxyethylene oleic acid, polyoxyethylene oleate ester, polyoxyethylene distearic acid ester, sorbitan laurate, sorbitan monostearate, sorbitan monooleate, sorbitan sesquiolate, polyoxyethylene monooleate, and polyoxyethylene stearate; polyether denatured siloxane-based surfactants, such as dimethyl polysiloxane; and fluorine-containing surfactants, such as fluorine alkyl esters, and perfluoroalkyl carboxylate. One or two or more different nonionic surfactants may be used in combination.

Among the above nonionic surfactants, the acetylene glycol-based surfactant and/or the polyether denatured siloxane surfactant are particularly preferable because of little foaming and an excellent defoaming ability.

Further examples of the acetylene glycol-based surfactants include 2,4,7,9-tetramethyl-5-decyne-4,7-diol, 3,6-dimethyl-4-octyne-3,6-diol, and 3,5-dimethyl-1-hexyne-3-ol. Alternatively, it may be any of commercially available products, such as Surfynol 104, 82, 465, 485, and TG of Air Products Co., Ltd. and Olfin STG and Olfin E1010 manufactured by Nissin Chemical Industry Co., Ltd. Further examples of polyether denatured siloxane-based surfactants include BYK-345, BYK-346, BYK-347, BYK-348, and UV3530 of Big Chemy Japan Co., Ltd. Two or more of them may be used in an ink composition, while the surface tensions thereof are preferably adjusted to 20 to 40 mN/m and the contents thereof in the ink composition are 0.1 to 3.0 wt %.

Preferably, the black ink composition of the present invention contains a pH adjuster. As a pH adjuster, any of alkanol amines, such as lithium hydroxide, pH adjusters, which can be used, include alkali hydroxides, such as lithium hydroxide, potassium hydroxide, and sodium hydroxide; and/or any of alkanol amines, such as ammonia, triethanol amine, tripropanol amine, diethanol amine, and monoethanol amine can be used. In particular, it is preferable that the black ink composition contains at least one pH adjuster selected from alkali metal hydroxides, ammonia, triethanol amine, and tripropanol amine and that the black ink composition be adjusted to pH 6 to 10. If the pH is out of such a range, materials or the like that constitute an ink jet printer will be badly affected, resulting in poor recover ability from clogging.

In addition, if necessary, collidine, imidazole, phosphoric acid, 3-(N-morpholino) propanesulfonic acid, tris(hydroxymethyl) aminomethane, boric acid, or the like can be used.

Furthermore, a defoaming agent, an antioxidant, an ultraviolet absorber, an antiseptic or antifungal agent, and so on can be added to the black ink composition, as necessary.

Antioxidants and ultraviolet absorbers, which can be used, include: alohanates such as alohanate and methyl alohanate;

biurets such as biuret, dimethyl biuret, and tetramethyl biuret; L-ascorbic acid and a salt thereof, and so on; Tinuvin 328, 900, 1130, 384, 292, 123, 144, 622, 770, and 292, Irgacor 252 and 153, Irganox 1010, 1076, 1035 and MD1024, and so on manufactured by Ciba Geigy Co., Ltd.; or lanthamide oxides and so on.

Examples of antiseptic agents and antifungal agents include sodium benzoate, sodium pentachlorophenol, sodium 2-pyridinethiol-1-oxide, sodium sorbate, sodium dehydroacetate and 1,2-dibenzisothiazolin-3-one (Proxel CRL, Proxel BDN, Proxel GXL, Proxel XL-2 or Proxel TN available from Avecia Co., Ltd.).

Color Ink Composition

A pigment for a color ink composition, which can be used in the present invention, is a self-dispersing pigment which can be dispersed and/or dissolved in water without any dispersant like a pigment of a black ink composition.

The color ink composition of the present invention is a self-dispersing pigment having a hydrophilic group on the surface thereof with a phenyl group interposed therebetween. The hydrophilic group is preferably one or more hydrophilic groups selected from a group consisting of —OM, —COOM, —CO—, —SO$_3$M, —SO$_2$M, —SO$_2$NH$_2$, and —RSO$_2$M, —PO$_3$HM, —PO$_3$M$_2$, —SO$_2$NHCOR, —NH$_3$, and —NR$_3$ (wherein M represents a hydrogen atom, an alkali metal, ammonium, or organic ammonium, and R represents a naphthyl group which may have an alkyl group with 1-12 carbon atoms or a substituent).

Examples of pigments, which can be used as a raw material of the self-dispersing pigment of the color ink composition, can include pigments such as Pigment Yellows, Pigment Reds, Pigment Violets, Pigment Blues and Pigment Blacks described in Color Index, and also include pigments of phthalocyanine, azo, anthraquinone, azomethine, and condensed ring families. Further, the pigments include organic pigments such as Yellow Nos. 4, 5, 205, and 401, Orange Nos. 228 and 405, Blue Nos. 1 and 404; and inorganic pigments such as titanium oxide, zinc oxide, zirconium oxide, iron oxide, ultramarine, Prussian blue, and chromium oxide. Specifically, for example, the pigments include C.I. Pigment Yellow 1, 3, 12, 13, 14, 17, 24, 34, 35, 37, 42, 53, 55, 74, 81, 83, 95, 97, 98, 100, 101, 104, 108, 109, 110, 117, 120, 128, 138, 150, 153, 155, 174, 180, and 198; C.I. Pigment Red 1, 3, 5, 8, 9, 16, 17, 19, 22, 38, 57:1, 90, 112, 122, 123, 127, 146, and 184; C.I. Pigment Violet 1, 3, 5:1, 16, 19, 23, and 38; and C.I. Pigment Blue 1, 2, 15, 15:1, 15:2, 15:3, 15:4, and 16. In particular, it is preferable that the organic pigment contained in the yellow ink composition includes at least one selected from a group consisting of C.I. Pigment Yellow 74, 109, 110, 128, 138, 147, 150, 155, 180, and 188; the organic pigment contained in the magenta ink composition includes at least one selected from a group consisting of C.I. Pigment Red 122, 202, 207, and 209 and C.I. Pigment violet 19; and the organic pigment contained in the cyan ink composition includes at least one selected from a group consisting of C.I. Pigment Blue 15, 15:1, 15:2, 15:3, 15:4, and 16.

On the other hand, the self-dispersing pigment of the color ink composition is manufactured by bonding a hydrophilic group to the surface of a pigment with a phenyl group interposed therebetween. As means for surface treatment by bonding the above functional group or the salt thereof, which is a hydrophilic group, to the surface of a pigment with a phenyl group interposed therebetween, various kinds of known means for surface treatment can be applied, such as a method for bonding a hydrophilic group through a phenyl group by bonding a sulfanilic group, p-aminobenzoic acid, 4-aminosalicylic acid, or the like to the surface of the pigment.

It is also possible to use a commercially-available product as the above self-dispersing pigment of the color ink composition, including CAB-O-JET 250C, CAB-O-JET 260M, CAB-O-JET 270Y (all manufactured by Cabot Corporation), and so on.

The content of the self-dispersing pigment in the color ink composition is preferably 6 wt % or more, like in the case of the black ink composition. If the pigment concentration is 6 wt % or more, the recorded material obtained therewith shows a high color development.

In addition, the self-dispersing pigment in the color ink composition preferably has an average particle size of 50 to 250 nm from the viewpoint of the storage stability of ink, prevention of nozzle clogging, and so on, like in the case of the black ink composition.

Furthermore, the color ink composition of the present invention preferably includes, at least, 60 to 10 wt % of water, and a water-soluble organic solvent and a surfactant, like in the case of the black ink composition. These specific examples and the amounts thereof added may be the same as those of the black ink composition.

Furthermore, a pH adjuster, a pH buffering agent, a defoaming agent, an antioxidant, an ultraviolet absorber, an antiseptic or antifungal agent, and so on can be added to the black ink composition of the present invention as necessary. Specific examples of these may be the same as those of the black ink composition.

Ink Set

The ink set according to the present invention can be constructed in a manner similar to that of a conventionally-known ink set and various kinds of conventionally-known recording methods can be thus used. In particular, in the present invention, the ink set is suitable to be used to perform printing by causing small droplets for ink jet recording, i.e., those of ink, to fly out and adhere to a recording medium such as paper from the viewpoint that it is possible to print an image with high quality and high resolution at high speed with a comparatively cheap device.

Ink Jet Record Method

The ink jet recording method according to the present invention performs printing by ejecting liquid droplets of an ink composition and allowing the ink droplets to adhere to a heated recording medium. Examples of the method for ejecting liquid droplets of each ink composition include: a method for recording characters and symbols on the surface of a recording medium by converting electric signals into mechanical signals using an electrostrictive element and intermittently ejecting ink stored in a nozzle head portion; and a method for recording characters and symbols on the surface of a recording medium by generating a bubble by rapidly heating ink stored in the nozzle head portion at a portion very near to the discharge portion and intermittently ejecting ink by volumetric expansion caused by such a bubble. According to a preferred embodiment of the present invention, the ink set of the present invention can be preferably used for an ink jet recording method using an electrostrictive element. Ejection of liquid droplets of each ink composition is preferably performed by a recording head that ejects ink droplets by making use of the mechanical action of a piezoelectric element.

A recorded material obtained by recording on a recording medium using the ink set of the present invention can realize a satisfactory image while having high color-developing ability.

Any of various kinds of recording media can be used and examples thereof include ink jet paper (matt paper, glossy paper, and so on), plain paper, printing paper, films, and so on.

EXAMPLES

Although the following examples will be used to describe the present invention in more detail, the present invention is not limited to these examples.

Self-Dispersing Pigment Binding to Hydrophilic Group with Phenyl Group Interposed Therebetween Preparation of Cyan Pigment Dispersion Liquid 1

A 4-liter stainless-steel beaker was attached to a rotor-stator high shear mixer (Silverson L4RT-A) and then dipped into an ice bath. Approximately 75 g of C.I. Pigment Blue 15:4 and 1000 g of water were placed in this beaker and then homogenized at 7200 rpm for 15 minutes. To this, 20 ml of an isopropanol solution with 2.07 g (0.01 mol) of o-acetoanisidide dissolved therein was added and then the mixture was further stirred for 15 minutes.

In another vessel, 4.35 g (0.025 mol) of sulfanilic acid, 30 ml of 1N-HCl, and 1.73 g (0.025 mol) of sodium nitrite were mixed together at a temperature of 5 to 10° C., thereby forming a diazonium salt. Subsequently, C.I. Pigment Blue 15:4 and o-acetoanisidide were added to the above mixture while stirring and maintaining the temperature at approximately 10° C. This mixture was adjusted to pH 5 to 6 by dropping of 5-M sodium hydroxide solution and further stirred for 2 hours while confirming the progress of a reaction with reference to the presence or absence of the diazonium salt. If the diazonium salt exists, when the reaction mixture and 1M $Na_2CO_3$ solution with dissolved 0.1% aminosalicylic acid are dropped drop by drop onto a sheet of filter paper, it becomes orange color when two expanding blotches formed by these droplets touch each other.

The mixture was transferred to a Telsonic flow-through sonicator and then subjected to ultrasound for 2 hours. The resulting pigment dispersion was purified using a 50-nm diafiltration membrane column and then concentrated to a solid content of 20%, thereby obtaining cyan pigment dispersion liquid 1.

Preparation of Magenta Pigment Dispersion Liquid 1

Magenta pigment dispersion liquid 1 was prepared in a manner similar to that of the above cyan pigment dispersion liquid 1, except for using C.I. Pigment Red 122 instead of C.I. Pigment Blue 15:4 as a pigment, thereby obtaining magenta pigment dispersion liquid 1 with a solid concentration of 20 wt %.

Preparation of Yellow Pigment Dispersion Liquid 1

Yellow pigment dispersion liquid 1 was prepared in a manner similar to that of the above cyan pigment dispersion liquid 1, except for using C.I. Pigment Yellow 74 instead of C.I. Pigment Blue 15:4 as a pigment, thereby obtaining yellow pigment dispersion liquid 1 with a solid concentration of 20 wt %.

Preparation of Black Pigment Dispersion Liquid 1

Black pigment dispersion liquid 1 was prepared in a manner similar to that of the above cyan pigment dispersion liquid 1, except for using C.I. Pigment Black 7 (Carbon Black) instead of C.I. Pigment Blue 15:4 as a pigment, thereby obtaining black pigment dispersion liquid 1 with a solid concentration of 20 wt %.

Preparation of Self-Dispersing Pigment Type Black Pigment Dispersion Liquid 2 Attached to Hydrophilic Group by Oxidation Treatment with Ozone Twenty grams of S170 (manufactured by Degussa AG), which is commercial carbon black, was mixed with 500 g of water and then dispersed using a home mixer for 5 minutes. The resulting liquid was placed in a 3-liter glass vessel equipped with a stirrer and ozone-containing gas with a ozone concentration of 8 wt % was then introduced thereto at a rate of 500 ml/min. while stirring with the stirrer. In this case, as an ozone generator, an electrolytic generation type ozonizer from Perumerekkusu Denkyoku Kabushikikaisha was used for the generation of ozone. The resulting original liquid was filtered using a glass fiber filter GA-100 (manufactured by Advantec Toyo Kaisha, Ltd.) and then concentrated up to a pigment concentration of 20 wt % while being adjusted to pH 9 by addition of 0.1 N potassium hydroxide solution, thus preparing black pigment dispersion solution 2.

Preparation of Cyan Pigment Dispersion Liquid 2

It was prepared in a manner similar to that of the above black pigment dispersion liquid 2, except for using C.I. Pigment blue 15:4 instead of S170 as a pigment, thereby obtaining cyan pigment dispersion liquid 2 with a solid concentration of 20 wt %.

Preparation of Magenta Pigment Dispersion Liquid 2

It was prepared in a manner similar to that of the above black pigment dispersion liquid 2, except for using C.I. Pigment Red 122 instead of S170 as a pigment, thereby obtaining magenta pigment dispersion liquid 2 with a solid concentration of 20 wt %.

Preparation of Yellow Pigment Dispersion Liquid 2

It was prepared in a manner similar to that of the above black pigment dispersion liquid 2, except for using C.I. Pigment yellow 74 instead of S170 as a pigment, thereby obtaining yellow pigment dispersion liquid 1 with a solid concentration of 20 wt %.

Preparation of Self-Dispersing Pigment Type Black Pigment Dispersion Liquid 3 Attached to Hydrophilic Group by Oxidation Treatment with Hypohalate One hundred grams of Carbon Black S170 (manufactured by Degussa AG) was mixed with 1 kg of water and then pulverized by a ball mill with zirconia beads. Into the pulverized original liquid, 1400 g of sodium hypochlorite (12% of available chlorine concentration) was dropped and then reacted for 5 hours while being pulverized in a ball mill, followed by wet oxidation by boiling for 4 hours while being stirred further. The resulting dispersed original liquid was filtered through glass fiber filter paper GA-100 (manufactured by Advantec Toyo Kaisha, Ltd.) and then washed with water. The resulting wet cake was redispersed in 5 kg of water, and then desalted and purified by a reverse osmotic membrane up to an electric conductivity of 2 mS/cm, followed by being concentrated up to a pigment concentration of 20 wt %. As a result, black pigment dispersion liquid 3 was prepared.

Preparation of Self-Dispersing Pigment Type Black Pigment Dispersion Liquid 4 Attached to Hydrophilic Group by Oxidation Treatment with Persulfate Oxidation treatment was performed by adding 150 g of Carbon Black S170 (manufactured by Degussa AG) to 3 L of aqueous 2 N sodium persulfate solution and mixing them while stirring for 10 hours at a stirring rate of 1 $s^{-1}$ at a temperature of 60° C. The oxidized carbon black was subjected to a process of residual salt separation using an ultrafiltration membrane (AHP-1010, manufactured by Asahi Kasei Corporation). Subsequently, it was adjusted to pH 8 by addition of an aqueous sodium hydroxide solution. Furthermore, the process using the ultrafiltration membrane was carried out again for purification by removal of excess salts and concentration by removal of water. Preparation was performed so that the concentration of carbon black in the aqueous solution after the treatment become 20 wt %, thereby preparing black pigment dispersion solution 4.

Preparation of each Ink Composition

Each of ink compositions was prepared by mixing individual components according to formulations listed in Table 1 below and then filtering the mixtures through a 10-μm membrane filter. Here, numeric values in Table 1 below represent contents (weight %) in ink, respectively. Ink sets 1 to 4 were constructed by combining the obtained individual ink compositions as shown in Table 2 below.

TABLE 1

|  | Cyan ink composition | | Magenta ink composition | | Yellow ink composition | | Black ink composition | | | | |
| --- | --- | --- | --- | --- | --- | --- | --- | --- | --- | --- | --- |
|  | C1 | C2 | M1 | M2 | Y1 | Y2 | K1 | K2 | K3 | K4 | K5 |
| Cyan pigment dispersion liquid 1 | 50 | — | — | — | — | — | — | — | — | — | — |
| Cyan pigment dispersion liquid 2 | — | 50 | — | — | — | — | — | — | — | — | — |
| Magenta pigment dispersion liquid 1 | — | — | 50 | — | — | — | — | — | — | — | — |
| Magenta pigment dispersion liquid 2 | — | — | — | 50 | — | — | — | — | — | — | — |
| Yellow pigment dispersion liquid 1 | — | — | — | — | 50 | — | — | — | — | — | — |
| Yellow pigment dispersion liquid 2 | — | — | — | — | — | 50 | — | — | — | — | — |
| Black pigment dispersion liquid 1 | — | — | — | — | — | — | 35 | — | — | — | — |
| Black pigment dispersion liquid 2 | — | — | — | — | — | — | — | 35 | — | — | 15 |
| Black pigment dispersion liquid 3 | — | — | — | — | — | — | — | — | 35 | — | — |
| Black pigment dispersion liquid 4 | — | — | — | — | — | — | — | — | — | 35 | — |
| Glycerin | 8 | 8 | 8 | 8 | 8 | 8 | 8 | 8 | 8 | 8 | 8 |
| Triethylene glycol | 5 | 5 | 5 | 5 | 5 | 5 | 5 | 5 | 5 | 5 | 5 |
| 1,2-hexanediol | 5 | 5 | 5 | 5 | 5 | 5 | 5 | 5 | 5 | 5 | 5 |
| Trimethyrol propane | 3 | 3 | 3 | 3 | 3 | 3 | 3 | 3 | 3 | 3 | 3 |
| Triethylene glycol butyl ether | 15 | 15 | 15 | 15 | 15 | 15 | 20 | 20 | 15 | 17 | 20 |
| Olfin E1010 | 0.5 | 0.5 | 0.5 | 0.5 | 0.5 | 0.5 | 0.5 | 0.5 | 0.5 | 0.5 | 0.5 |
| Surfynol 104 | 0.5 | 0.5 | 0.5 | 0.5 | 0.5 | 0.5 | 0.5 | 0.5 | 0.5 | 0.5 | 0.5 |
| Triethanol amine | 1 | 1 | 1 | 1 | 1 | 1 | 1 | 1 | 1 | 1 | 1 |
| Water | Rest | Rest | Rest | Rest | Rest | Rest | Rest | Rest | Rest | Rest | Rest |
| Pigment in ink composition | 10 | 10 | 10 | 10 | 10 | 10 | 7 | 7 | 7 | 7 | 3 |
| Water in ink composition | 52 | 52 | 52 | 52 | 52 | 52 | 50 | 50 | 55 | 53 | 54 |

TABLE 2

|  | Ink set | Cyan ink composition | Magenta ink composition | Yellow ink composition | Black ink composition |
| --- | --- | --- | --- | --- | --- |
| Example 1 | Ink set 1 | C1 | M1 | Y1 | K2 |
| Example 2 | Ink set 2 | C1 | M1 | Y1 | K1 |
| Example 3 | Ink set 3 | C1 | M1 | Y1 | K3 |
| Example 4 | Ink set 4 | C1 | M1 | Y1 | K4 |
| Example 5 | Ink set 5 | C1 | M1 | Y1 | K5 |
| Comparative Example 1 | Ink set 6 | C2 | M2 | Y2 | K2 |
| Comparative Example 2 | Ink set 7 | C2 | M2 | Y2 | K1 |

Evaluation Method

Evaluation 1: Measurement of OD Values

Each of the prepared ink sets was filled into the Ink Jet Printer PX-A550 (manufactured by Seiko Epson Corp.) and a 100%-duty patch pattern including cyan, magenta, yellow, black, red, green, and blue areas was printed. Xerox 4200 and Xerox P were used for the recording media and the resulting samples were then left standing for 1 hour under a typical environment. The OD values of the respective patch areas were measured using a Gretag densitometer (manufactured by GretagMacbeth Inc.). The mean OD value was determined using the following evaluation criteria. The results are shown in Table 3 below.

A; An OD value of 1.3 or more
B; An OD value of 1.15 or more but less than 1.3
C; An OD value of less than 1.15

Evaluation 2: Color Reproductivity

For each prepared ink set, a dedicated output pattern consisting of 400 patches was printed using the same ink jet printer as described above. Colorimetric measurement was performed on patches of all printed materials and the volume of L*a*b* in 3D space was then calculated by using an arithmetic tool. The calculated GumatVolume is dimensionless. Evaluation of color reproductivity was performed with reference to the following criteria based on the calculated GumatVolume values. The results are shown in Table 3 below.

A; 240,000 or more
B; 200,000 or more but less than 240,000
C; Less than 200,000

Evaluation 3: Ejection Stability

Each prepared ink set was loaded into the same ink jet printer PX-A550 as described above, and patterns including solid areas and lined areas were printed continuously in an environment at 40° C. In the case of disturbances in printing occurring due to nozzle separation or curvature of the flying ink during printing, a reset operation (cleaning) provided in the recording apparatus was performed as the situation required. The number of times the above required cleaning was carried out within 100 pages of continuous printing was measured, and those results were evaluated based on the following criteria. The results are shown in Table 3 below.

A: When cleaning was not required
B: When less than three rounds of cleaning were required
C: When three or more rounds of cleaning were required Evaluation 4: Recover Ability from Clogging For each of the prepared ink compositions, in a manner similar to the above description, after confirming that the ink compositions had been discharged from all nozzles, the ink compositions were allowed to stand for 1 week in an environment at 40° C. without one ink cartridges being installed and with the printer head located away from the home position (state in which the printer head is shifted from the location of the cap equipped on the printer so that the printer head is not capped). After being left standing, the ink compositions were again discharged from all nozzles, the number of times cleaning was required until the printing quality became equal to the initial state was counted, and the results were evaluated based on the following criteria. The results are shown in Table 3 below.

A: When printing equivalent to the initial state was obtained by 3 rounds or less of cleaning B: When printing equivalent to the initial state was obtained by 4 to 9 rounds of cleaning C: When printing equivalent to the initial state was impossible even after ten or more rounds of cleaning

TABLE 3

|  | OD value | Color reproductivity | Ejection stability | Recover ability from clogging |
|---|---|---|---|---|
| Example 1 | A | A | A | A |
| Example 2 | B | B | A | B |
| Example 3 | A | A | A | A |
| Example 4 | A | A | A | A |
| Example 5 | B | B | A | A |
| Comparative Example 1 | B | B | C | C |
| Comparative Example 2 | C | C | C | C |

What is claimed is:

1. An ink set comprising two or more ink compositions that include at least a black ink composition and a color ink composition, wherein
    said black ink composition includes a self-dispersing pigment having a hydrophilic group on the surface thereof; and
    said color ink composition includes a self-dispersing pigment having a phenyl group bonded to the surface of the pigment and having a hydrophilic group bonded to the phenyl group.

2. The ink set according to claim 1, wherein said self-dispersing pigment in each ink composition has a content of 6 wt % or more.

3. The ink set according to claim 1, wherein the binding of said hydrophilic group on the surface of a black pigment is attained by subjecting the pigment to an oxidation treatment.

4. The ink set according to claim 3, wherein said oxidation treatment is an oxidation treatment with hypohalous acid and/or hypohalate, an oxidation treatment with ozone, or an oxidation treatment with persulfuric acid and/or persulfate.

5. The ink set according to claim 1, wherein said hydrophilic group is one or more functional groups selected from a group consisting of —OM, —COOM, —CO—, —SO$_3$M, —SO2M, —SO2NH2 and —RSO2M, —PO3HM, —PO3M2, —SO2NHCOR, —NH3, and —NR3, wherein M represents a hydrogen atom, a hydrogen atom, an alkali metal, ammonium, or organic ammonium, and R represents a naphthyl group which may have an alkyl group or a substituent with 1-12 carbon atoms.

6. The ink set according to claim 1, wherein said black ink composition includes at least 10 to 60 wt % of water, a water-soluble organic solvent, and a surfactant and said color ink composition includes at least 10 to 60 wt % of water, a water-soluble organic solvent, and a surfactant.

7. The ink set according to claim 6, wherein each of said ink compositions includes, as said water-soluble organic solvent, 5 wt % or more of polyvalent alcohol monoalkyl ether and/or a nitrogen-containing cyclic compound and polyvalent alcohols.

8. The ink set according to claim 6, wherein said surfactant is an acetylene glycol-based surfactant and/or a polyether denatured siloxane surfactant.

9. An ink jet recording method, comprising:
    ejecting liquid droplets of an ink composition and allowing said liquid droplets to adhere to a recording medium, wherein an ink set according to claim 1 is used.

* * * * *